US012640504B2

(12) United States Patent
Wang

(10) Patent No.: US 12,640,504 B2
(45) Date of Patent: May 26, 2026

(54) TERMINAL ASSEMBLY AND METHOD FOR FABRICATION THEREOF

(71) Applicant: Changchun Jetty Automotive Technology Co., Ltd., Changchun (CN)

(72) Inventor: Chao Wang, Changchun (CN)

(73) Assignee: Changchun Jetty Automotive Technology Co., Ltd., Changchun (CN)

( * ) Notice: Subject to any disclaimer, the term of this patent is extended or adjusted under 35 U.S.C. 154(b) by 360 days.

(21) Appl. No.: 18/255,320

(22) PCT Filed: Oct. 20, 2021

(86) PCT No.: PCT/CN2021/124846
§ 371 (c)(1),
(2) Date: May 31, 2023

(87) PCT Pub. No.: WO2022/127345
PCT Pub. Date: Jun. 23, 2022

(65) Prior Publication Data
US 2024/0006783 A1 Jan. 4, 2024

(30) Foreign Application Priority Data
Dec. 16, 2020 (CN) ......................... 202011488709.2

(51) Int. Cl.
*H01R 4/62* (2006.01)
*H01R 11/11* (2006.01)
*H01R 43/02* (2006.01)

(52) U.S. Cl.
CPC ............. *H01R 4/625* (2013.01); *H01R 11/11* (2013.01); *H01R 43/0207* (2013.01); *H01R 2201/26* (2013.01)

(58) Field of Classification Search
CPC ......... H01R 11/11; H01R 11/32; H01R 11/00; H01R 11/01; H01R 4/625; H01R 4/62;
(Continued)

(56) References Cited

U.S. PATENT DOCUMENTS 5,281,762 A * 1/1994 Long .................... H01R 12/598 29/857
5,364,292 A * 11/1994 Bethurum .......... H01R 13/6599 439/607.02

(Continued)

FOREIGN PATENT DOCUMENTS

CN 107743429 A 2/2018
CN 111462946 A 7/2020

(Continued)

OTHER PUBLICATIONS

International Searching Authority, "Written Opinion," issued in connection with International Patent Application No. PCT/CN2021/124846, dated Dec. 22, 2021, 11 pages. [English translation included].

(Continued)

*Primary Examiner* — Harshad C Patel
(74) *Attorney, Agent, or Firm* — Hanley, Flight & Zimmerman, LLC

(57) ABSTRACT

The present disclosure provides a terminal assembly and a method for fabrication thereof. The terminal assembly includes a connection terminal, a wire, and an electric energy transfer member. The electric energy transfer member includes at least one metal member. When there are two or more metal members, the metal members are arranged at intervals or overlapped or partially overlapped. Each metal member is located between the connection terminal and an inner core of the wire and serve as a conductive member during welding of the connection terminal and the inner core of the wire. A stiffness of the metal member is less than that of the connection terminal.

15 Claims, 2 Drawing Sheets

(58) Field of Classification Search
CPC ........ H01R 4/00; H01R 4/02; H01R 43/0207; H01R 2201/26
See application file for complete search history.

(56) References Cited

U.S. PATENT DOCUMENTS

| | | | | | |
|---|---|---|---|---|---|
| 5,964,620 | A * | 10/1999 | Takahashi | H01R 13/6589 | 439/579 |
| 6,031,185 | A * | 2/2000 | Bouveret | H01R 4/646 | 439/98 |
| 6,107,572 | A * | 8/2000 | Miyazaki | H01R 9/0518 | 174/75 C |
| 6,273,753 | B1 * | 8/2001 | Ko | H01R 13/65915 | 439/497 |
| 6,336,827 | B1 * | 1/2002 | Akama | H01R 13/658 | 439/98 |
| 6,380,485 | B1 * | 4/2002 | Beaman | H01R 13/6589 | 439/497 |
| 6,793,527 | B2 * | 9/2004 | Noro | H01R 13/6581 | 439/497 |
| 7,192,301 | B2 * | 3/2007 | Kuroda | H01R 13/6589 | 439/497 |
| 7,351,096 | B2 * | 4/2008 | Kondou | H01R 24/44 | 439/607.41 |
| 7,628,647 | B2 * | 12/2009 | Semba | H01R 12/598 | 439/579 |
| 7,677,927 | B2 * | 3/2010 | Hermant | H01R 13/6593 | 439/607.46 |
| 7,770,290 | B2 * | 8/2010 | Nakamae | H01R 12/598 | 29/857 |
| 7,819,675 | B2 * | 10/2010 | Ko | H01R 13/65914 | 439/98 |
| 8,118,612 | B2 * | 2/2012 | Morikawa | H01R 9/0518 | 439/578 |
| 8,192,222 | B2 * | 6/2012 | Kameyama | H01R 9/03 | 439/404 |
| 8,758,051 | B2 * | 6/2014 | Nonen | H05K 3/3405 | 439/579 |
| 8,840,432 | B2 * | 9/2014 | Alden, III | H05K 1/0216 | 439/607.46 |
| 8,853,538 | B2 * | 10/2014 | Yamada | H01R 12/598 | 174/94 R |
| 8,961,201 | B2 * | 2/2015 | Griese | H01R 9/2675 | 439/121 |
| 9,088,079 | B2 * | 7/2015 | Kumakura | H01R 43/048 | |
| 9,397,411 | B2 * | 7/2016 | Ito | H01R 9/0518 | |
| 9,640,880 | B2 * | 5/2017 | Tran | H01R 13/65915 | |
| 9,692,182 | B2 * | 6/2017 | Maeda | H01R 13/6467 | |
| 9,728,912 | B2 * | 8/2017 | Kasturi | H05K 3/32 | |
| 10,833,426 | B2 * | 11/2020 | Hoenle | H01R 43/048 | |
| 11,349,267 | B2 * | 5/2022 | Dong | H01R 13/6591 | |
| 11,824,284 | B2 * | 11/2023 | Yamamoto | H02G 15/08 | |
| 2003/0114046 | A1 * | 6/2003 | Noro | H01R 12/592 | 439/579 |
| 2005/0282434 | A1 * | 12/2005 | Morikawa | H01R 9/0518 | 439/578 |
| 2010/0096185 | A1 * | 4/2010 | Otsuka | H01R 43/0207 | 174/94 R |
| 2012/0325554 | A1 * | 12/2012 | Aizawa | H01R 12/596 | 174/84 R |
| 2013/0188325 | A1 * | 7/2013 | Garman | H01R 13/6592 | 29/829 |
| 2014/0170897 | A1 * | 6/2014 | Nonen | H01R 13/5829 | 29/857 |
| 2015/0187462 | A1 | 7/2015 | Kondo et al. | | |
| 2015/0325930 | A1 * | 11/2015 | Hoenle | H01R 43/048 | 29/882 |
| 2018/0109015 | A1 | 4/2018 | Gregor | | |
| 2023/0112646 | A1 | 4/2023 | Wang | | |
| 2024/0006783 | A1 | 1/2024 | Wang | | |

FOREIGN PATENT DOCUMENTS

| | | | |
|---|---|---|---|
| CN | 211507921 | U | 9/2020 |
| CN | 112531360 | A | 3/2021 |
| CN | 214227160 | U | 9/2021 |
| EP | 4266504 | A1 | 10/2023 |
| JP | H10172710 | A | 6/1998 |
| JP | 2007305314 | A | 11/2007 |
| JP | 2009070769 | A | 4/2009 |
| JP | 2014100019 | A | 5/2014 |
| WO | 2022127345 | A1 | 6/2022 |

OTHER PUBLICATIONS

International Bureau, "International Preliminary Report on Patentability," issued in connection with International Patent Application No. PCT/CN2021/124846, Jun. 13, 2023, 13 pages. [English translation included].

Japan Patent Office, "Decision of Refusal", issued in connection with JP Patent Application No. 2023-536519 on Feb. 21, 2025, 6 pages, (English Translation Included).

European Patent Officem, "Communication Pursuant to Article 94(3) EPC", issued in connection with EP Patent Application No. 21 905 274.3 on Feb. 2, 2025. 6 pages.

China National Intellectual Property Administration, "International Search Report," in connection with International Patent Application No. PCT/CN2021/124846, issued Dec. 22, 2021, 6 pages, with English Translation.

China National Intellectual Property Administration, "Office Action" issued on May 6, 2025 for counterpart Chinese Patent Application No. 2020114887092, 13 pages (English Translation Included).

Brazilian Patent Office, "Office Action and Search Report" issued on May 27, 2025 for counterpart BR patent Application No. BR1120230102723, 8 pages (English Translation Included).

Japanese Patent Office, "Notice of Reasons for Refusal," issued in connection with Japanese Patent Application No. 2023-536519, dated Apr. 30, 2024, 12 pages. [English translation provided].

European Patent Office, "Extended European Search Report," issued in connection with European Patent Application No. 21905274.3, dated May 16, 2024, 11 pages.

Vietnam Intellectual Property Office, "The First Office Action," issued in connection with Vietnamese Patent Application No. 1-2023-04542, issued on Aug. 16, 2025, 4 pages. [with English translation].

Canadian Intellectual Property Office, "First Office Action," issued in connection with Canadian Patent Application No. 3202442, dated Nov. 18, 2024, 4 pages.

Japanese Patent Office, "Notice of Reasons for Refusal," issued in connection with Japanese Patent Application No. 2023-536519, dated Oct. 15, 2024, 8 pages. [English translation provided].

The State Intellectual Property Office of People's Republic of China, "First Office Action," issued in connection with Chinese Patent Application No. 202011488709.2, dated Nov. 25, 2024, 12 pages. [English translation provided].

China National Intellectual Property Administration, "First Search Report," issued in connection with Chinese Patent Application No. 202011488709.2, dated Nov. 25, 2024, 4 pages. [English translation provided].

* cited by examiner

TERMINAL ASSEMBLY AND METHOD FOR FABRICATION THEREOF

CROSS REFERENCE TO RELATED APPLICATIONS

The present disclosure is a National Stage of International Application No. PCT/CN2021/124846, filed on Oct. 20, 2021, which claims priority to Chinese Patent Application No. 202011488709.2, filed on Dec. 16, 2020, which are hereby incorporated by reference in their entireties.

TECHNICAL FIELD

The present disclosure relates to a technical field of electrically conductive metal connections, and particularly to a terminal assembly and a method for fabrication thereof.

BACKGROUND

In the automobile industry, the wire is the most important part of the wiring harness. The research and selection of lighter and more reliable substitute products has become a hot topic in the field of wiring harness lightweighting. Copper is widely used because of its good electrical conductivity, thermal conductivity and plasticity. However, copper resources are in short supply and the cost of copper is high. Especially in recent years, with the soaring price of copper, the continuous popularization and application of aluminum wires and the progress of technology, the material of the wiring harness is constantly replaced by aluminum wires. Aluminum also has the excellent electrical conductivity, thermal conductivity and plastic processability, so replacing copper with aluminum is the main development trend at present. However, some properties of aluminum are still not as good as copper, and it is still impossible to completely replace copper with aluminum in many members, so there is joint welding between aluminum and copper members. For example, wires made of aluminum materials are used as cables, and when such cables are connected to copper members of various electrical devices or connected to copper cables, the copper and aluminum contact ends are connected by welding.

However, the connectivity between the aluminum wire and the copper terminal is poor, and it is impossible to obtain good mechanical properties by directly welding the copper terminal and the aluminum wire. Although the aluminum wire and the aluminum terminal have excellent weldabilities, most of the terminal posts on a vehicle are made of copper or other non-aluminum materials, and the use of the aluminum terminal is easy to cause an electrochemical corrosion. Therefore, it is necessary to use non-aluminum terminals, and an effective method is urgently needed to solve this problem.

SUMMARY

The present disclosure provides a terminal assembly and a method for fabrication thereof to improve the connection effect of the terminal assembly.

It is a first aspect of the present disclosure to provide a terminal assembly including a connection terminal, a wire and an electric energy transfer member. The electric energy transfer member includes at least one metal member. The metal member is located between the connection terminal and an inner core of the wire, and serves as a conducting member during welding of the connection terminal and the inner core of the wire.

In the above technical solution, a rigidity of the metal member is generally less than that of the connection terminal.

In the above technical solution, the electric energy transfer member is taken as an energy transfer channel between the connection terminal and the wire during welding, so that the energy is concentrated when the connection terminal and the wire are welded, thereby improving the welding effect between the connection terminal and the wire.

In a specific implementation, a rigidity of each metal member is less than that of the connection terminal. The rigidity of the metal member being less than that of the connection terminal is beneficial to the welding of the metal member and the connection terminal, and avoids the damage of the shearing stress of the connection terminal to the cable as much as possible.

Further, a surface state of each metal member is one selected from the group consisting of flat, uneven, partially convex, wavy and wrinkled, or any combination thereof, so as to advantageously increase the contact between the surface of the metal member and the welding zone.

In a specific implementation, the inner core includes one or more selected from the group consisting of multi-strand bare wires, braided bare wires and a sheet-shaped wire, but is not limited thereto, and any material that can be used as the inner core of the wire is possible.

In a specific implementation, the connection terminal has a welding zone, and the metal member is placed, or wound, or press-attached, or laser-welded, or electromagnetically welded, or spot-welded, or nested on a periphery of the inner core of the wire and/or the welding zone of the connection terminal. That is, the metal member may be connected to the inner core of the wire firstly, so as to prevent the inner core of the wire from being scattered and facilitate the welding of the inner core and the connection terminal. The metal member may also be connected to the welding zone of the connection terminal firstly, which is convenient for fixing and can effectively improve the welding performance. Alternatively, the metal members may be connected to the inner core of the wire and the welding zone of the connection terminal firstly, respectively, and then both of them are welded by ultrasonic welding.

In a specific implementation, when there are at least two metal members, the at least two metal members are arranged at intervals or at least partially overlapped.

In a specific implementation, the shapes of different metal members may be the same or different, and the thicknesses of different metal members may be the same or different.

In a specific implementation, when the at least two metal members are arranged at intervals, a distance between any adjacent metal members is 0.1 mm to 8 mm. When two or more metal members are arranged at intervals, a high-frequency friction between the inner core of the wire and the connection terminal is increased during welding, thereby improving the welding effect. Further, a surface area of each metal member is 1% to 48% of an area of the welding zone.

In a specific implementation, a thickness of each metal member is 0.01% to 90% of a thickness of the connection terminal, so as to ensure that the metal member has a proper thickness to improve the welding effect between the connection terminal and the wire.

In a specific implementation, the inner core of the wire, the metal member and the connection terminal are connected by ultrasonic welding.

The ultrasonic welding means that under the joint action of a welding static pressure and a ultrasonic high-frequency vibration, high-frequency friction occurs on a welding interface, resulting in a high-rate plastic deformation and a rapid temperature rise, thereby breaking and removing oxide films and pollutants on the interface, so that pure bare metal atoms contact to form a welding joint in the form of metal bonds, thereby improving the welding effect between the connection terminal and the wire. The ultrasonic welding parameters include a welding pressure from 0 bar to 7 bar, welding energy from 0 J to 100,000 J and a welding amplitude from 50% to 200%, which may be adjusted depending on different products.

It is a second aspect of the present disclosure to provide a method for fabrication of a terminal assembly, and the method includes:

placing, or winding, or press-attaching, or laser-welding, or electromagnetically welding, or spot-welding, or nesting a metal member on a periphery of an inner core of a wire and/or a welding zone of a connection terminal; and welding the connection terminal, the metal member and the inner core of the wire by ultrasonic welding. The metal member is located between the connection terminal and the inner core of the wire, and serves as a conducting member during welding of the connection terminal and the inner core of the wire.

Further, when there are at least two metal members, the at least two metal members are arranged at intervals or at least partially overlapped.

Further, a rigidity of the metal member is less than that of the connection terminal.

Further, the inner core of the wire is exposed by peeling off part of an insulation layer.

In a specific implementation, the inner core of the wire and the metal member are both made of aluminum. By adopting the same material for the metal member and the inner core of the wire, the connection effect between the aluminum inner core and the metal member is effectively improved, and the welding effect is enhanced by the effective bonding between the metal member and the connection terminal.

Further, the metal member is any one of an aluminum foil, an aluminum strip or an aluminum sheet.

REFERENCE NUMERALS OF MAIN COMPONENTS

10: connection terminal; 20: wire; 30: electric energy transfer member; 11: welding zone; 12: non-welding zone; 21: inner core; 22: insulation layer; 31: metal member.

DETAILED DESCRIPTION

In order to facilitate the understanding of the terminal assembly according to the embodiments of the present disclosure, the application scenarios of the terminal assembly will now be introduced. The terminal assembly according to the embodiments of the present disclosure is applied to the connection of various live components in an automobile. First of all, the components of the terminal assembly according to the embodiments of the present disclosure are connected by welding, and the adopted welding mode may include, but is not limited to, ultrasonic welding. For the convenience of description, ultrasonic welding is taken as an example throughout the following description.

Although the aluminum wire and aluminum terminal have excellent weldabilities, most of the terminal posts on a vehicle are made of copper or other non-aluminum materials, resulting in a poorly reliable connection. Consequently, it is impossible to obtain good mechanical properties by directly welding the terminal and the aluminum wire. Therefore, the embodiments of the present disclosure provide a terminal assembly to improve the welding effect between a cable and a terminal which are made of different materials. The detailed description is given below with reference to specific embodiments and drawings.

Figure 1:
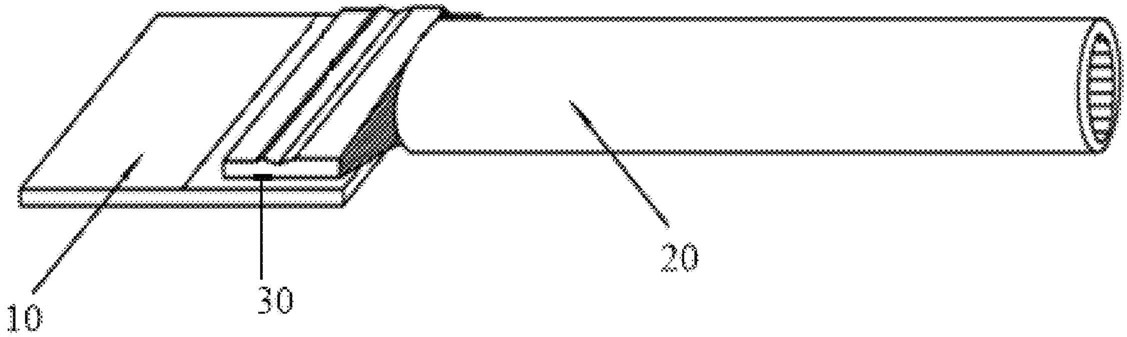
FIG. 1 illustrates a schematic structural diagram of a terminal assembly according to an embodiment of the present disclosure.

FIG. 1 illustrates a schematic structural diagram of a terminal assembly according to an embodiment of the present disclosure. The terminal assembly according to the embodiment of the present disclosure includes a connection terminal 10, a wire 20 and an electric energy transfer member 30. The connection terminal 10 and the wire 20 are made of different materials. Exemplarily, the connection terminal 10 may be a copper terminal, and the wire 20 may be an aluminum wire. The electric energy transfer member 30 is located between the connection terminal 10 and the wire 20, and serves as a connection medium for welding between the connection terminal 10 and the wire 20 to enhance the welding effect. The cooperation between the electric energy transfer member 30 and the wire 20 and the connection terminal 10 will be described with reference to specific drawings.

Figure 2:
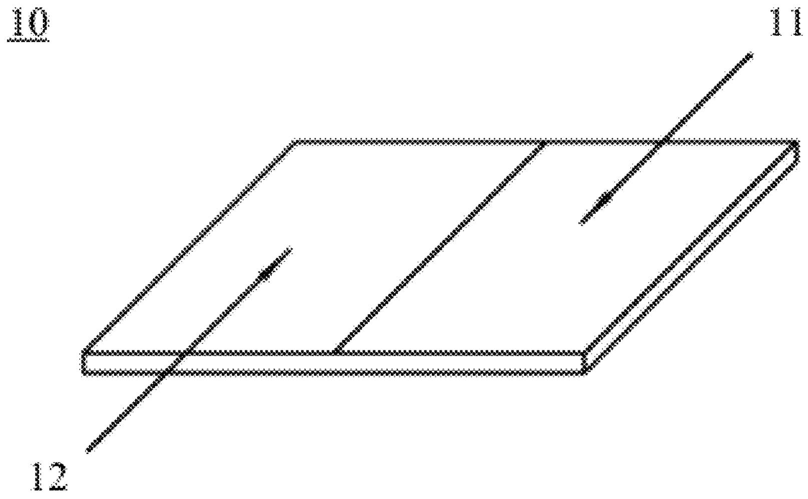
FIG. 2 illustrates a schematic structural diagram of a connection terminal according to an embodiment of the present disclosure.

Referring to FIG. 2, which illustrates a schematic structural diagram of a connection terminal. The connection terminal 10 is divided into a welding zone 11 and a non-welding zone 12 according to function. The welding zone 11 is an area where the connection terminal 10 is in contact with the electric energy transfer member and the wire. The wire 20 and the electric energy transfer member 30 are located in the welding zone 11 during welding.

Although FIG. 2 illustrates that the connection terminal 10 is a rectangular structure, the shape of the connection terminal 10 illustrated in FIG. 2 is just an example. The connection terminal 10 according to the embodiment of the present disclosure may be any shape, such as a circle, an ellipse, a square, an irregular shape, etc. The surface of the connection terminal 10 may be a concave-convex structure, and may be plated or partially plated.

As an optional solution, the welding zone 11 and the non-welding zone 12 are arranged side by side to facilitate the welding of the wire 20 and the electric energy transfer member 30 with the connection terminal 10. It should be understood that the arrangement of the welding zone 11 and the non-welding zone 12 according to the embodiment of the present disclosure may also adopt other modes, for example, the non-welding zone 12 is nested in the welding zone 11, or other arrangement modes, which is not specifically limited herein.

As an optional solution, the material of the connection terminal 10 according to the embodiment of the present disclosure is not limited to copper, iron or other electrically conductive metal materials. Alternatively, the connection terminal 10 may be made of multiple materials. Hereinafter, the copper terminal is taken as an example for explanation.

As an optional solution, the connection terminal 10 is provided with a plating layer, which is not limited to tin plating, nickel plating, silver plating, etc., and other materials may be used. The plating layer prevents the connection terminal 10 from being oxidized to protect the connection terminal 10. Specifically, the plating layer may be only provided in the welding zone 11, or both the welding zone 11 and the non-welding zone 12.

Figure 3:
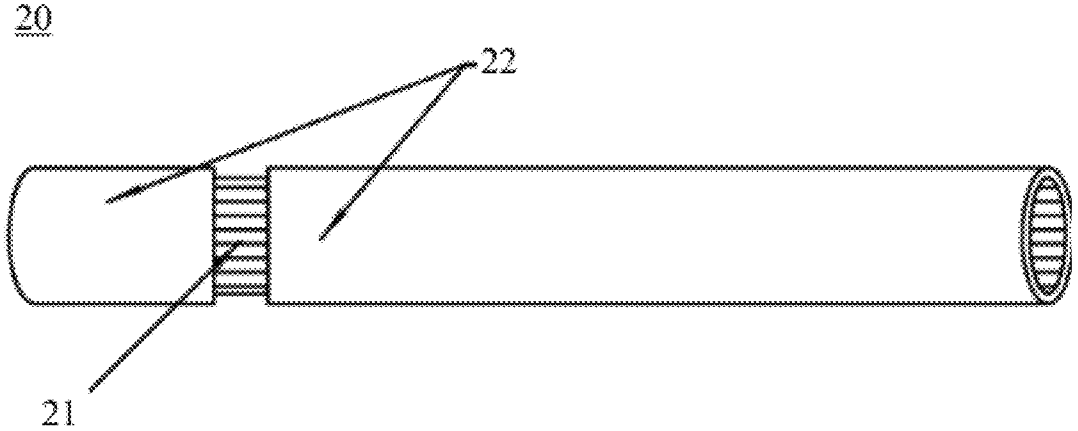
FIG. 3 illustrates a schematic structural diagram of a wire according to an embodiment of the present disclosure.

Referring to FIG. 3, which illustrates a schematic structural diagram of a wire. The wire 20 according to the embodiment of the present disclosure includes an inner core 21 and an insulation layer 22 on the inner core 21.

As an optional solution, the inner core 21 of the wire 20 according to the embodiment of the present disclosure includes, but is not limited to, one or more selected from the group consisting of multi-strand bare wires, braided bare wires and a sheet-shaped conductor, and other types of conductors may also be used. For the convenience of understanding, hereinafter the multi-strand bare wires are taken as an example for explanation. As illustrated in FIG. 3, the multi-strand bare wires serve as the inner core 21 of the wire 20, and the insulation layer 22 wraps on an outer layer of the multi-strand bare wires and serves as a protective layer of the inner core 21.

During welding of the wire 20 and the connection terminal 10, part of the insulation layer 22 of the wire 20 is peeled off, so that the inner core 21 of the wire 20 is exposed for welding with the electric energy transfer member 30 and the copper terminal. It should be understood that the peeling length of the insulation layer 22 meets the length requirements of the inner core 21 during welding.

As an optional solution, the wire 20 according to the embodiment of the present disclosure is not limited to the aluminum wire, and may also be wires made of other materials. For the convenience of understanding, hereinafter only the aluminum wire is taken as an example for explanation.

Figure 4:
FIG. 4 illustrates a schematic diagram of cooperation between a wire and an electric energy transfer member according to an embodiment of the present disclosure.

Referring to FIG. 4, which illustrates a schematic diagram of cooperation between the electric energy transfer member 30 and the wire 20. The electric energy transfer member 30 includes at least one metal member 31. When there are two or more metal members 31, they may be arranged at intervals or at least partially overlapped along an axial direction of the wire. As illustrated in FIG. 4, the electric energy transfer member 30 includes two metal members 31, but the number of the metal members 31 is not limited herein, and the metal members 31 may be arranged in different numbers, such as one, two, three, four, etc.

As an optional solution, at least one metal member 31 is placed, or wound, or press-attached, or laser-welded, or electromagnetically welded, or spot-welded, or nested on a periphery of the multi-strand bare wires. When there are two or more metal members 31, the adjacent metal members 31 may be arranged at intervals or at least partially overlapped. When the metal member 31 is placed, or wound, or press-attached, or laser-welded, or electromagnetically welded, or spot-welded, or nested on the multi-strand bare wires, the multi-strand bare wires may be wrapped by the metal member 31 to avoid being scattered and to facilitate being welded with the copper terminal. As a specific implementation, at least one metal member 31 may be directly press-attached on the periphery of the inner core 21 by a press-attaching device, which ensures the stability of the connection between the metal member 31 and multi-strand bare wires, while binding the multi-strand bare wires together. As an optional solution, the metal member 31 may also be provided in the welding zone 11 of the terminal by means of placement, winding, press-attaching, laser-welding, electromagnetic welding, spot-welding or nesting on.

The metal member 31 according to the embodiment of the present disclosure has a rigidity less than that of the connection terminal 10. Since the metal member 31 has certain mechanical properties, good electrical conductivity, and a rigidity less than that of the connection terminal 10, it is beneficial to improve the welding effect between the inner core 21 of the wire and the connection terminal 10. Exemplarily, the material of the metal member 31 may be at least one selected form the group consisting of nickel, cadmium, zirconium, chromium, manganese, aluminum, tin, titanium, zinc, cobalt, gold and silver, or alloys thereof. As an optional solution, the metal member 31 may be an aluminum metal member, such as an aluminum foil, an aluminum strip or an aluminum sheet. When the metal member 31 is made of aluminum, the material of the metal member 31 is the same as that of the inner core 21 of the wire, thereby improving the welding effect between the inner core 21 of the wire and the connection terminal 10.

In an optional solution, the surface state of each metal member 31 is one selected from the group consisting of flat, uneven, partially convex, wavy and wrinkled, or any combination thereof. When the above surface state is adopted, the contact between the metal member 31 and the welding zone 11 can be advantageously increased.

In an optional solution, when there are two or more metal members 31, the shapes and thicknesses of different metal members may be the same or different, which may be set as needed and is not specifically limited herein.

During welding, the structure illustrated in FIG. 4 is placed into an ultrasonic welding machine, which welds the metal member 31 wrapping the inner core 21 and the connection terminal 10 into the shape illustrated in FIG. 1. During welding, at least one metal member 31 is located between the connection terminal 10 and the inner core of the wire 20 and serves as an auxiliary material to improve the welding effect between the connection terminal 10 and the inner core of the wire 20.

It is found in researches of the present disclosure that during ultrasonic welding, under the joint action of a welding static pressure and a ultrasonic high-frequency vibration, high-frequency friction occurs on a welding interface between to-be-welded workpieces (the copper terminal and the inner core), resulting in a high-rate plastic deformation and a rapid temperature rise, thereby breaking and removing oxide films and pollutants on the interface, so that pure bare metal atoms contact to form a welding joint in the form of metal bonds. However, a plastic flow ability of metal varies at different temperatures, and the interface formation is also different. During ultrasonic welding, the welding energy, the amplitude and the welding static pressure can influence the friction at the interface in different ways, and then directly influence the friction heat generation at the interface and the plastic flow ability of metal, thereby influencing the quality of the terminal assembly. Thus, at least one metal member is adopted in the embodiment of the present disclosure. When there are two or more metal members, they are arranged at intervals or overlapped or partially overlapped to increase a tangential friction of the workpieces in the welding zone, so as to obtain more energy, and the temperature of the welding zone rises, thereby enhancing the plastic fluidity between metals and achieving the effect of enhancing the connection strength.

It is found in researches of the present disclosure that during welding, the high-frequency vibration wave is transferred to the surfaces of two to-be-welded objects, and under the condition of pressurization, the surfaces of the two objects rub against each other to achieve a fusion between molecular layers. A plurality of aluminum foils are added to increase the welding friction and generate more heat, so as to concentrate the energy and increase the connection strength.

As can be seen from the above description, when the electric energy transfer member according to the embodiment of the present disclosure is cooperated with the copper terminal and the aluminum wire, firstly, due to a contact resistance between aluminum wires (the inner core of the wire), the contact between the aluminum wire and the metal member can be realized by wrapping the aluminum wires with the metal member, thereby effectively improving the welding effect. Secondly, when the metal member is contacted with the copper terminal, it is possible to effectively prevent a relatively loose welding surface from being formed between the aluminum wires and the connection terminal. By wrapping the aluminum wires with the metal member, the surface-to-surface welding is realized, so that the welding energy can better act between the terminal and the aluminum wire during the ultrasonic welding, thereby enhancing the mechanical properties of the welding connection. Thirdly, the metal member introduced between the copper terminal and the aluminum wire has a material similar to that of the aluminum wire, so that no new impurities are introduced and the electrical properties after welding will not be affected.

In actual welding, the number of the metal members, the surface area of each metal member, and the interval or the overlapping distance between the metal members are appropriately increased according to the size of the welding zone. As an optional solution, at least one metal member 31 is disposed, and when there are two or more metal members 31 arranged at intervals, a distance between any adjacent metal members 31 ranges from 0.1 mm to 8 mm. For example, the distance between the adjacent metal members 31 may be different distances such as 0.1 mm, 0.5 mm, 2 mm, 5 mm and 8 mm, which specifically may be set according to the widths and the thicknesses of the metal members 31, so as to ensure that the welding energy can be mainly concentrated between the connection terminal 10 and the inner core 20 of the wire, thereby ensuring the mechanical properties thereof after welding.

As shown in Table 1, when two or more metal members are arranged at intervals, the influence of the distance between the adjacent metal members on the mechanical properties (tensile properties) of welding is obtained by comparison. The test of mechanical properties is carried out in a tensile test device with a fixture. The specific method is that wires or plates on both sides of a welding spot are placed into the fixture and clamped, and insulation layers of the wires in the fixture are removed to ensure that the wires will not fall off in the tensile test. The tensile test is performed on the wires with respective diameters in the welding spot, a cross-sectional area of a wire to be tested should be less than that of a wire butted in the welding spot, and a plurality of wires may be merged. A tensile speed of the tensile test device is (50±5) mm/min.

TABLE 1

| | Serial number | | | | |
|---|---|---|---|---|---|
| Distance/mm | 1 | 2 | 3 | 4 | 5 |
| 0 | 2056.36N | 1789.34N | 1976.75N | 1844.67N | 1955.32N |
| 0.1 | 3565.12N | 3412.01N | 3616.78N | 3361.5N | 3424.67N |
| 0.5 | 3846.21N | 3794.22N | 4012.45N | 3346.48N | 4017.84N |
| 2 | 4058.31N | 4103.51N | 3987.36N | 4012.65N | 4013.57N |
| 5 | 4074.75N | 3985.34N | 4018.35N | 4035.36N | 2896.24N |
| 8 | 3896.24N | 3946.25N | 4016.53N | 3923.74N | 4015.62N |

As can be seen from the above table, when the distance between the metal members exceeds 0.1 mm, the mechanical properties of welding will be greatly changed. In consideration of the actual size of the conventional terminal and the number of the metal members, the spacing space is not recommended to exceed 8 mm. Therefore, the optimal distance ranges from 0.1 mm to 8 mm.

As an optional solution, when two or more metal members are arranged at intervals, a surface area of each of the metal members 31 is at least 1% to 48% of an area of the welding zone, such as 1%, 10%, 15%, 20%, 30%, 40%, etc., which specifically may be set according to the distance between the metal members and the thicknesses thereof, and the welding parameters may be adjusted during welding to improve the welding effect between the connection terminal 10 and the inner core 20 of the wire. As illustrated in Tables 2, 3 and 4, the relative size of the surface area of each of the metal members is the percentage thereof in the welding zone, and the influence of the relative size of the surface area of each of the metal members on the mechanical properties of welding is obtained by comparison (considering the actual use situation, a test range greater than 2,000 N is selected). The test methods of mechanical properties in Tables 2 to 4 are the same as that in Table 1.

TABLE 2

| | Sample 1 (N) | Sample 2 (N) | Sample 3 (N) |
|---|---|---|---|
| 0% | 1902 | 1833 | 1735 |
| 5% | 2569 | 2621 | 2647 |
| 10% | 2684 | 2587 | 2678 |
| 15% | 2878 | 2957 | 2794 |
| 20% | 3018 | 3184 | 3157 |
| 25% | 3487 | 3589 | 3511 |
| 30% | 3618 | 3649 | 3781 |
| 35% | 3857 | 3901 | 3944 |
| 40% | 4108 | 4284 | 4199 |
| 45% | 4018 | 4125 | 3948 |
| 50% | 2158 | 2507 | 1969 |

TABLE 3

| | Sample 1 (N) | Sample 2 (N) | Sample 3 (N) |
|---|---|---|---|
| 0% | 1902 | 1833 | 1735 |
| 1% | 2341 | 2511 | 2218 |
| 2% | 2347 | 2415 | 2371 |
| 3% | 2409 | 2489 | 2392 |

TABLE 3-continued

| | Sample 1 (N) | Sample 2 (N) | Sample 3 (N) |
|---|---|---|---|
| 4% | 2399 | 2418 | 2568 |
| 5% | 2569 | 2621 | 2647 |

TABLE 4

| | Sample 1 (N) | Sample 2 (N) | Sample 3 (N) |
|---|---|---|---|
| 45% | 4018 | 4125 | 3948 |
| 46% | 4128 | 4011 | 4201 |
| 47% | 4019 | 4218 | 4315 |
| 48% | 4109 | 4188 | 4319 |
| 49% | 2018 | 1974 | 2219 |
| 50% | 2158 | 2507 | 1969 |

As can be seen from Table 2, good mechanical properties can be achieved when the test data ranges from 5% to 45%. In order to further clarify the optimization range, tests are carried out according to the ranges of Tables 2 and 3 to obtain the data in Tables 2 and 3. As can be seen from the data in Table 3, when the test data is greater than or equal to 1% (that is, the surface area of each of the metal members 31 is more than 1% of the area of the welding zone), the test result is above 2,000 N, which meets the requirements. As can be seen from the data in Table 4, when the test data exceeds 48% (that is, the surface area of each of the metal members 31 is more than 48% of the area of the welding zone), the mechanical properties are significantly decreased, and the test result is below 2,000 N. Furthermore, to sum up, when the test range is 1% to 48% (that is, the surface area of each of the metal members 31 is 1% to 48% of the area of the welding zone), the mechanical properties are significantly improved.

As an optional solution, the thickness of the metal member 31 is 0.01% to 90% of the thickness of the connection terminal. Through a series of creative experiments, it is known that the welding effect between the connection terminal 10 and the wire 20 can be changed by using the metal member 31 with different thicknesses. It should be understood that in the embodiment of the present disclosure, the thickness of the metal member 31 may be uniform, non-uniform or the both, and the shape of the metal member is also not limited, which is not specifically limited herein.

As shown in Tables 5 and 6, through a series of experiments, it is found that the thickness of the metal member 31 needs to be within a reasonable range to ensure the mechanical result of the welding of the connection terminal 10 and the wire 20. The influence of different thicknesses of each of the metal members on the mechanical properties of the welding can be obtained by comparison. The test methods of mechanical properties in Tables 5 and 6 are the same as that in Table 1, and a test range of greater than 2,000 N is selected according to actual use situation.

TABLE 5

| Proportion of thickness of the metal member 31 to thickness of the terminal | Sample 1 (N) | Sample 2 (N) | Sample 3 (N) |
|---|---|---|---|
| 0.005% | 1709 | 1967 | 1511 |
| 10% | 3018 | 3481 | 2918 |
| 20% | 3347 | 3487 | 3318 |
| 30% | 3548 | 3518 | 3481 |

TABLE 5-continued

| Proportion of thickness of the metal member 31 to thickness of the terminal | Sample 1 (N) | Sample 2 (N) | Sample 3 (N) |
|---|---|---|---|
| 40% | 3818 | 3884 | 3871 |
| 50% | 3884 | 3971 | 4001 |
| 60% | 4218 | 4258 | 4109 |
| 70% | 4587 | 4625 | 4651 |
| 80% | 4521 | 4618 | 4729 |
| 90% | 4581 | 4319 | 4688 |
| 100% | 1977 | 1874 | 2018 |

TABLE 6

| Proportion of thickness of the metal member 31 to thickness of the terminal | Sample 1 (N) | Sample 2 (N) | Sample 3 (N) |
|---|---|---|---|
| 0.005% | 1709 | 1967 | 1511 |
| 0.01% | 2518 | 2117 | 2071 |
| 0.02% | 2107 | 2218 | 2481 |
| 0.03% | 2125 | 2481 | 2108 |
| 0.04% | 2218 | 2247 | 2587 |
| 0.05% | 2581 | 2478 | 2487 |

As can be seen from Table 5, when the proportion is 0.005% and 100% (i.e., when the thickness of the metal member is 0.005% and 100% of the thickness of the terminal, respectively), the change of mechanical properties is not ideal, and when the proportion ranges from 10% to 90% (i.e., the thickness of the metal member is 10% to 90% of the thickness of the terminal), the drawing force performance in the test data is good, which is always greater than 2,000 N. In order to further confirm the range, the test as shown in Table 6 is carried out to obtain the test results as shown in Table 6, which indicate that when the proportion is greater than or equal to 0.01% (i.e., the thickness of the metal member is more than 0.01% of the thickness of the terminal), the mechanical properties are significantly improved. To sum up, when the thickness of the metal member is 0.01% to 90% of the thickness of the terminal, the mechanical properties of welding can be effectively improved.

Figure 5:
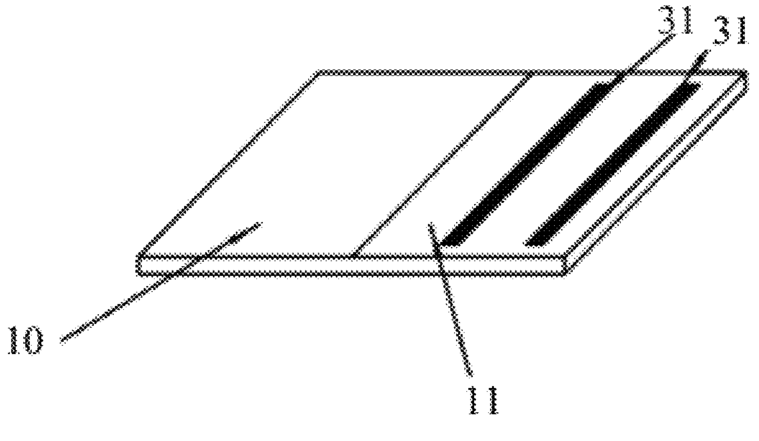
FIG. 5 illustrates a schematic diagram of cooperation between a connection terminal and an electric energy transfer member according to an embodiment of the present disclosure.

Referring to FIG. 5, which illustrates another arrangement of the electric energy transfer member 30. The connection terminal 10 has a welding zone 11. At least one metal member 31 is tiled in the welding zone 11 and welded with the connection terminal 10. When there are two or more metal members 31, they are arranged at intervals or overlapped or partially overlapped to be tiled in the welding zone 11 and welded with the connection terminal 10. By connecting the metal member 31 to the connection terminal 10 firstly, it facilitates the welding of the metal member 31 and the wire 20.

In the structure illustrated in FIG. 5, the arrangement of the electric energy transfer member 30 is changed. The electric energy transfer member 30 may be obtained by directly cutting two sections of aluminum sheets with appropriate sizes and placing them in the welding zone 11 of the connection terminal 10, or directly press-attaching the metal member 31 on the welding zone 11 by a press-attaching machine. Due to the viscosity of the metal member 31, the metal member 31 may be slightly adhered to the connection terminal 10, which is beneficial to the ultrasonic welding process and then to achieve the welding purpose. When the electric energy transfer member 30 is preset as above, it is also possible to achieve the purpose of improving the welding effect between the connection terminal 10 and the wire 20.

In order to facilitate the understanding that the welding effect between the copper terminal and the aluminum wire is improved by the electric energy transfer member according to the embodiment of the present disclosure, mechanical property tests are carried out on the terminal assembly according to the embodiment of the present disclosure, on the terminal assembly in the prior art, and on the terminal assembly with a plating layer. As shown in Table 7, the difference between the three groups of terminal assemblies lies in the non-plated terminal, the plated terminal, and the aluminum sheets of the electric energy transfer member according to the embodiment of the present disclosure. In the prior art, the terminal assembly adopts welding the copper terminal and the aluminum wire. The test method of mechanical properties in Table 7 is the same as that in Table 1.

TABLE 7

| Serial No. | 1 | 2 | 3 | 4 | 5 |
|---|---|---|---|---|---|
| Bare copper without aluminum sheets | 1833.83N | 1894.38N | 2259.86N | 2172.89N | 2364.04N |
| Bare copper with aluminum sheets | 3551.95N | 4071.74N | 3762N | 4038.34N | 4090.17N |
| With plating layer and without aluminum sheets | 2998.34N | 3245.37N | 3145.24N | 3500.34N | 3109.47N |

| Serial No. | 6 | 7 | 8 | 9 | 10 |
|---|---|---|---|---|---|
| Bare copper without aluminum sheets | 1926.18N | 1736.45N | 2165.25N | 1849.36N | 1976.27N |
| Bare copper with aluminum sheets | 3896.24N | 3946.25N | 4016.53N | 3974.23N | 4036.28N |
| With plating layer and without aluminum sheets | 3056.28N | 3174.69N | 3345.16N | 3145.68N | 3094.31N |

As can be seen from Table 4, the test performance of the drawing force is significantly improved when the aluminum sheets of the electric energy transfer member are added.

In addition, an embodiment of the present disclosure further provides a method for fabrication of a terminal assembly, which is used for fabricating the terminal assembly. The structural features of the terminal assembly involved in the method may refer to the above description and will not be repeated in the method. The method includes the following steps:

Step 001: peeling off an insulation layer at an end of a wire to expose an inner core of the wire;

specifically, in the above step, it should be appreciated that a peeling length of the wire meets a size required for welding;

Step 002: machining at least one metal member on the inner core of the wire;

specifically, at least one metal member is placed, or wound, or press-attached, or laser-welded, or electromagnetically welded, or spot-welded or nested on the inner core of the wire. When there are two or more metal members, they are arranged at intervals or overlapped or partially overlapped along the inner core of the wire. The metal members of appropriate sizes and different modes for the machining process may be selected depending on the specific welding requirements.

Step 003: welding the inner core of the wire of at least one metal member and a connection terminal by ultrasonic welding;

specifically, the connection terminal, and the inner core of the wire on which the metal member has been machined, are overlapped and placed under an ultrasonic welding head using an appropriate tooling to start the ultrasonic welding, thereby obtaining the assembly as illustrated in FIG. 1.

An embodiment of the present disclosure further provides another method for fabrication of a terminal assembly, and the method includes the following steps:

Step 001: machining at least one metal member on a welding zone of a connection terminal;

specifically, the metal member may be machined on the welding zone of the connection terminal using different machining processes, such as placement, winding, press-attaching, laser-welding, electromagnetic welding, spot-welding and nesting on;

Step 002: peeling off an insulation layer at an end of a wire to expose an inner core of the wire;

Step 003: welding the connection terminal, on which the at least one metal member has been machined, and the inner core of the wire by ultrasonic welding.

Specifically, the connection terminal on which the metal member has been machined, and the inner core of the wire are overlapped and placed under an ultrasonic welding head using an appropriate tooling to start the ultrasonic welding, thereby obtaining the electric energy assembly as illustrated in FIG. 1.

As can be seen from the above description, the terminal assembly according to the embodiments of the present disclosure can be fabricated by different methods, and can effectively improve the drawing force borne by the copper terminal and the aluminum wire after being welded, thereby improving the reliability of the terminal assembly.

Obviously, those skilled in the art can make various modifications and variations to the present disclosure without departing from the spirit and scope of the present disclosure. In this way, it is intended that the present disclosure includes those modifications and variations provided that they fall within the scope of the claims and equivalents thereof

What is claimed is:

1. A terminal assembly, comprising a connection terminal, a wire and an electric energy transfer member; wherein the electric energy transfer member comprises at least one metal member;

the at least one metal member is located between the connection terminal and an inner core of the wire, and serves as a conducting member during welding of the connection terminal and the inner core of the wire;

the at least one metal member includes at least two metal members, and the at least two metal members are arranged at intervals;

the inner core of the wire, the at least two metal members and the connection terminal are connected by ultrasonic welding; and a rigidity of each of the at least two metal members is less than that of the connection terminal.

2. The terminal assembly according to claim 1, wherein a surface state of each metal member is one selected from the group consisting of flat, uneven, partially convex, wavy and wrinkled, or any combination thereof.

3. The terminal assembly according to claim 1, wherein the inner core comprises one or more selected from the group consisting of multi-strand bare wires, braided bare wires and a sheet-shaped conductor.

4. The terminal assembly according to claim 1, wherein the connection terminal has a welding zone, and the at least one metal member is placed, or wound, or press-attached, or laser-welded, or electromagnetically welded, or spot-welded, or nested on a periphery of the inner core of the wire and/or the welding zone of the connection terminal.

5. The terminal assembly according to claim 1, wherein when the at least two metal members are arranged at intervals, a distance between any adjacent metal members is 0.1 mm to 8 mm.

6. The terminal assembly according to claim 1, wherein a surface area of each metal member is 1% to 48% of an area of the welding zone.

7. The terminal assembly according to claim 1, wherein a thickness of each metal member is 0.01% to 90% of a thickness of the connection terminal.

8. The terminal assembly according to claim 1, wherein the at least two metal members are arranged at intervals along an axial direction of the wire, to increase a tangential friction between the connection terminal and the inner core of the wire during ultrasonic welding.

9. The terminal assembly according to claim 8, wherein the at least two metal members are wound around a periphery of the inner core of the wire.

10. The terminal assembly according to claim 8, wherein the connection terminal has a welding zone, and the at least two metal members are tiled on the welding zone and welded with the connection terminal.

11. The terminal assembly according to claim 8, wherein the connection terminal has a welding zone, the at least two metal members are tiled on the welding zone, the at least two metal members are aluminum sheets, and the aluminum sheets are adhered or press-attached to the welding zone.

12. The terminal assembly according to claim 8, wherein the at least two metal members are spaced apart from an insulation layer of the wire in the axial direction of the wire.

13. The terminal assembly according to claim 1, wherein connection terminal is plate-shaped.

14. A method for fabrication of a terminal assembly, comprising:

placing, or winding, or press-attaching, or laser-welding, or electromagnetically welding, or spot-welding, or nesting at least two metal members on a periphery of an inner core of a wire and/or a welding zone of a connection terminal, wherein the connection terminal and the wire are made of different materials, the at least two metal members are arranged at intervals or at least partially overlapped with each other, and a rigidity of each of the at least two metal members is less than that of the connection terminal; and welding the connection terminal, the at least two metal members and the inner core of the wire by ultrasonic welding;

wherein at least two metal members are is located between the connection terminal and the inner core of the wire, and serves as a conducting member during welding of the connection terminal and the inner core of the wire.

15. A terminal assembly, comprising a connection terminal, a wire and an electric energy transfer member; wherein the electric energy transfer member comprises at least one metal member;

the at least one metal member is located between the connection terminal and an inner core of the wire, and serves as a conducting member during welding of the connection terminal and the inner core of the wire;

the at least one metal member includes at least two metal members, and the at least two metal members are at least partially overlapped with each other;

the inner core of the wire, the at least two metal members and the connection terminal are connected by ultrasonic welding; and a rigidity of each of the at least two metal members is less than that of the connection terminal.

* * * * *